United States Patent [19]

Ichikawa

[11] 4,249,784
[45] Feb. 10, 1981

[54] BEARING ASSEMBLY

[75] Inventor: Michihiro Ichikawa, Kiryu, Japan

[73] Assignee: Ichikawa Iron Works Company Limited, Kiryu, Japan

[21] Appl. No.: 71,232

[22] Filed: Aug. 30, 1979

[30] Foreign Application Priority Data

Sep. 6, 1978 [JP] Japan .................. 53-108474
Apr. 20, 1979 [JP] Japan .................. 54-48848

[51] Int. Cl.³ ............................. F16C 19/49
[52] U.S. Cl. ......................... 308/202; 308/177; 308/207 R; 308/DIG. 15
[58] Field of Search ............... 308/202, 207 R, 177, 308/189 R, 183, DIG. 15, DIG. 13, 212

[56] References Cited
U.S. PATENT DOCUMENTS

| 2,903,307 | 9/1959 | Peters et al. | 308/177 |
| 3,806,213 | 4/1974 | Nagai | 308/207 R |
| 4,021,086 | 5/1977 | Rajsigl | 308/189 R |

Primary Examiner—Lenard A. Footland
Attorney, Agent, or Firm—Armstrong, Nikaido, Marmelstein & Kubovcik

[57] ABSTRACT

A bearing assembly comprising a casing, a bearing holder formed with a cavity therein and closely fitted in the casing and at least three bearing units retained in position in the cavity of the bearing holder and arranged in symmetry about the center axis of the cavity, wherein each of the bearing units comprises a rotatable member freely rotatable in the cavity about an axis parallel with the center axis of the cavity, an inner race member rotatable with the rotatable member, an outer race member fast on the bearing holder, and bearing elements rollably disposed between the inner and outer race members and wherein the shaft or spindle to be supported by the bearing assembly is in rollable contact with the respective rotatable members of the individual bearing units.

49 Claims, 9 Drawing Figures

BEARING ASSEMBLY

FIELD OF THE INVENTION

The present invention relates to a bearing assembly for supporting an elongated rotary member such as a shaft, spindle or the like which is to be driven for rotation about the axis thereof at a superhigh speed of, for example, more than 30,000 revolutions per minute.

BACKGROUND OF THE INVENTION

In some kinds of rotary machines, the shafts or spindles to carry the rotational motions are driven to rotate at superhigh speeds which reach 30,000 to 50,000 revolutions per minute in the case of some textile production equipment such as for example roving frames, spinning frames and throwing machines. Such a superhigh speed rotation of a shaft or spindle imposes various exacting requirements on the bearing assembly to be used to support the shaft or spindle. One of these requirements is to cope with the wear and abrasion of the members and elements of the bearing assembly which are subject to sliding and rolling frictions concomitant with the superhigh speed rotation of the shaft or spindle supported by the bearing assembly.

A known bearing assembly which has been used for supporting the spindle of a textile production equipment such as typically a yarn wrapping machine is largely made up of an ordinary ball bearing consisting of inner and outer race members and spherical bearing elements interposed between the inner and outer race members. The shaft or spindle to be supported by such a bearing assembly is securely connected to the inner race member of the ball bearing so that the shaft or spindle and the inner race member of the bearing are to be driven to rotate as a single unit about the center axis of the shaft or spindle with respect to the outer race member fixed to a suitable stationary structure. Thus, the inner race member of the ball bearing is driven to rotate at a speed equal to the speed of rotation of the shaft or spindle supported by the bearing assembly and, for this reason, the maximum speed of rotation allowable of the shaft or spindle is limited by the wear and abrasion resistance of the ball bearing.

In the field of machine engineering, it is known that ball bearings in general tend to be critically worn out to such an extent as to be no longer serviceable when subjected to continuous rotation at speeds exceeding about 15,000 revolutions per minute. With the rotational mechanism in which the shaft or spindle is connected to the inner race member of a ball bearing, therefore, the shaft or spindle must be driven for rotation at a speed lower than 15,000 revolutions per minute. This has brought forth a bar to increasing the performance efficiency or achieving the desired performance efficiency of, for example, a yarn wrapping machine.

It is, accordingly, a prime object of the present invention to provide a bearing assembly which is capable of withstanding the rotation at speeds higher than 30,000 revolutions per minute and maintaining a shaft, spindle or the like in a stable condition for an extended period of time.

It is another object of the present invention to provide a bearing assembly in which the revolution speed of the shaft or spindle supported by the bearing assembly is transmitted, upon reduction, to the rotary member of a bearing forming part of the bearing assembly so that the shaft or spindle can be driven to rotate at a speed higher in a desired ration than the upper limit of the acceptable range of the revolution speed of the bearing assembly.

It is still another object of the present invention to provide a bearing assembly which is constructed and arranged in such a manner that the loads imparted to the bearing assembly in radial directions from the shaft or spindle supported by the bearing assembly so that the shaft or spindle is maintained in a correct coaxial position with respect to the bearing assembly and is prevented from being caused to sway or laterally oscillate during superhigh speed rotation of the shaft or spindle.

It is still another object of the present invention to provide a bearing assembly in which the impacts and vibrations which may be transferred to the bearing assembly from the shaft or spindle supported by the bearing assembly can be efficiently dampened out so that the shaft or spindle is enabled to rotate smoothly and noiselessly in the bearing assembly.

Yet, it is another object of the present invention to provide a superhigh speed bearing assembly which is simple in construction and economical to manufacture and to maintain and service.

SUMMARY OF THE INVENTION

In accordance with the present invention, the above described objects of the invention are accomplished by a bearing assembly for an elongated rotary member rotatable about the center axis thereof, the bearing assembly comprising, in combination, a stationary hollow casing, a bearing holder closely and detachably fitted in the casing and formed with a cavity having a center axis therethrough and including a central portion and at least three generally semicylindrical groove portions merging radially outwardly from the central portion, and bearing units positioned each in part in the semicylindrical groove portions, respectively, of the cavity and substantially semicylindrically protruding each in part into the central portion of the cavity in the bearing holder, each of the bearing units comprising a rotatable member having a circular cross section and rotatable in part in the central portion of the cavity and in part within each of the semicylindrical groove portions of the cavity about an axis substantially parallel with the center axis of the cavity in the bearing holder, and at least one bearing comprising an inner race member positioned on one side of the rotatable member and rotatable with the rotatable member, an outer race member radially spaced apart from the inner race member and closely and detachably fitted to the bearing holder, and a plurality of bearing elements rollably disposed between the inner and outer race members, the respective rotatable members of the individual bearing units being larger in diameter than the respective outer race members in the individual bearing units and forming therebetween an open space for passing the aforesaid elongated rotary member therethrough so that the spindle is in rollable contact with the peripheral surfaces of the respective rotatable members of the bearing units and is retained in a position having its center axis substantially in alignment with the center axis of the cavity in the bearing holder.

The semicylindrical groove portions of the cavity in the bearing holder are preferably arranged substantially in symmetry about the center axis of the cavity in the bearing holder. The bearing holder may be further formed with an axial gap extending throughout the axial length of the bearing holder and located intermediate between neighboring two of the semicylindrical groove portions of the cavity in the bearing holder and/or openings or recesses respectively open to the semicylindrical groove portions of the cavity radially inwardly of the bearing holder for providing a clearance for the rotation of the rotatable member of each of the bearing units. If the openings are formed in the bearing holder, the openings are open not only to the semicylindrical groove portions, respectively, of the cavity in the bearing holder but radially outwardly of the bearing holder. If, on the other hand, the recesses are formed in the bearing holder, the recesses are closed in outer wall portions of the bearing holder. If desired, the bearing holder may be further formed with axial grooves longitudinally extending substantially in parallel with the center axis of the cavity in the bearing holder and open to the central portion of the cavity radially inwardly of the bearing holder, each of the axial grooves intervening between every neighboring two of the semicylindrical groove portions of the cavity in the bearing holder.

The casing may comprise a hollow, generally cylindrical portion having the above described bearing holder closely and detachably fitted to the inner peripheral surface thereof. The cylindrical portion of the casing may be formed with an axial gap extending throughout the axial length of the cylindrical portion so that the cylindrical portion is contractable and expansible about the center axis of the cylindrical portion. In this instance, the casing may further comprise two lug portions fast on the cylindrical portion of the casing and spaced apart from each other for forming therebetween a gap contiguous to the axial gap in the cylindrical portion of the casing. The casing having these lug portions is provided with adjustable clamp engaging both of the lug portions for adjustably clamping the lug portions together and thereby adjustably tightening the cylindrical portion of the casing onto the bearing holder fitted in the cylindrical portion.

A bearing assembly according to the present invention may further comprise a resilient cushioning element elastically pressed between the bearing holder and the casing. In this instance, the bearing holder is formed with a circumferential groove which is open radially outwardly of the bearing holder and which has the above mentioned cushioning element closely and detachably fitted therein. Preferably, the cushioning element is provided adjacent each axial end of the bearing holder.

DESCRIPTION OF THE DRAWINGS

The features and advantages of a bearing assembly according to the present invention will be more clearly understood from the following description taken in conjunction with the accompanying drawings in which like reference numerals designate corresponding or similar elements, members and structures and in which.

DETAILED DESCRIPTION OF THE INVENTION

Figure 1:
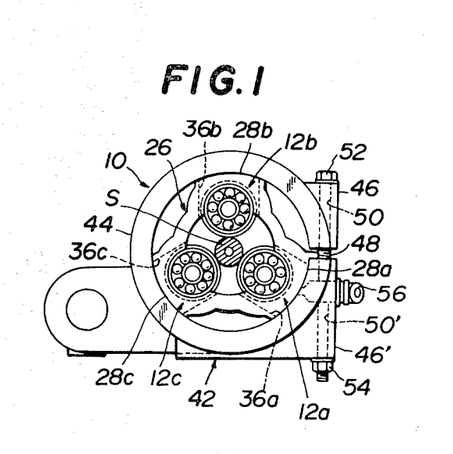
FIG. 1 is a plan or axial end view showing a preferred embodiment of a bearing assembly according to the present invention.

Referring to FIG. 1 of the drawings, a bearing assembly embodying the present invention is designated in its entirety by reference numeral 10 and comprises three or more bearing units which are, in the embodiment herein shown, assumed to consist of three bearing units 12a, 12b and 12c by way of example. The individual bearing units 12a, 12b and 12c are constructed similarly and dimensioned equally to one another and are, thus, commonly represented by a bearing unit 12 in FIG. 2.

Figure 2:
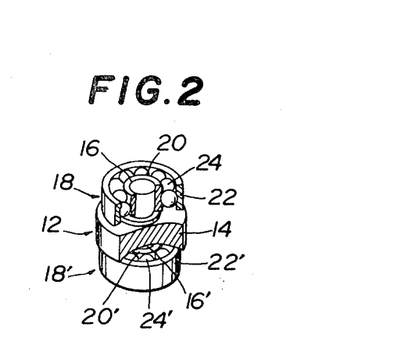
FIG. 2 is a partially cut-away perspective view showing each of the bearing units forming part of the embodiment illustrated in FIG. 1.

In FIG. 2, the bearing unit 12 is shown comprising a cylindrical or disc-shaped rotatable member 14 having a circular cross section and rotatable about its center axis with a pair of shafts 16 and 16' axially projecting in the opposite directions from both sides of the rotatable member 14. The shafts 16 and 16' have respective center axes aligned with the center axis of the rotatable member 14 and may be either individually secured to the rotatable member 14 or constructed as portions of a unitary shaft which is securely passed through the rotatable member 14 in the axial direction of the rotatable member. The shafts 16 and 16' thus projecting from the rotatable member 14 have mounted thereon ball bearings 18 and 18', respectively. The ball bearing 18 on the shaft 14 consists of an inner race member 20 secured to and rotatable with the shaft 14, an outer race member 22 radially outwardly spaced apart from the inner race member 20, and a plurality of spherical bearing element 24 rotatably and slidably disposed between the inner and outer race members 20 and 22. Likewise, the ball bearing 18' on the shaft 16' consists of an inner race member 20' secured to and rotatable with the shaft 14', an outer race member 22' radially outwardly spaced apart from the inner race member 20', and a plurality of spherical bearing elements 24' rotatable and slidably disposed between the inner and outer race members 20' and 22'. The rotatable member 14 and each of the respective outer race members 22 and 22' of the ball bearings 18 and 18' are, thus, rotatable relative to each other about the aligned center axes of the rotatable member 14 and each of the shafts 16 and 16'. The outer race members 22 and 22' of the two ball bearings 18 and 18', respectively, have substantially equal outside diameters which are smaller than the outside diameter of the rotatable member 14.

Figure 3:
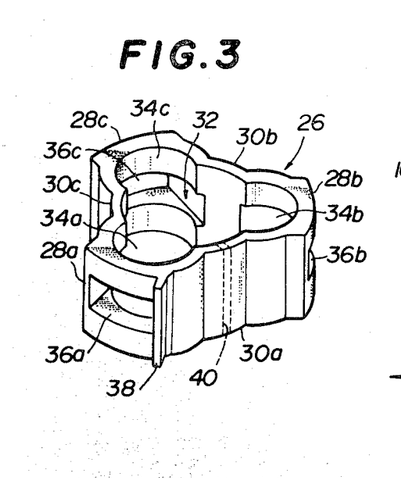
FIG. 3 is a perspective view showing, to an enlarged scale, the bearing holder also forming part of the embodiment illustrated in FIG. 1.

The bearing units 12a, 12b and 12c each constructed as above described are assembled together in a bearing holder 26 which is illustrated more clearly in FIG. 3. Referring to FIG. 3, the bearing holder 26 consists of a unitary block constructed of an elastic material and having a center axis therethrough and flat opposite end faces perpendicular to the center axis of the block. The bearing holder 26 has a generally trefoil cross section substantially symmetric about the center axis of the holder and comprises three radial protrusions 28a, 28b and 28c radially outwardly projecting from the center axis of the bearing holder 26 and merging with one another through intermediate wall portions 30a, 30b and 30c which intervene between the radial protrusions as shown. The radial protrusions 28a, 28b and 28c of the bearing holder 26 are thus angularly spaced apart equally from each other across the intermediate wall portions 30a, 30b and 30c, respectively, about the center axis of the bearing holder 26 and have respective outer faces arcuately curved about the center axis of the bearing holder 26.

The bearing holder 26 thus externally configured is internally formed with a cavity 32 which is open at the opposite axial ends of the bearing holder 26. The cavity 32 has a generally triradiate cross section substantially symmetric about the center axis of the bearing holder 26 and, thus, includes a central portion about the center axis of the bearing holder 26 and three generally semicylindrical groove portions 34a, 34b and 34c formed in the above described radial protrusions 28a, 28b and 28c, respectively, of the bearing holder 26 and merging radially outwardly from the central portion of the cavity 32. The semicylindrical groove portions 34a, 34b and 34c of the cavity 32 are, thus, arranged substantially in symmetry about the center axis of the bearing holder 26 and have diameters which are substantially equal to one another. The diameters of the semicylindrical groove portions 34a, 34b and 34c are further such that the outer race members 22 and 22' of each of the bearing units 12a, 12b and 12c can be closely received in each of the groove porions 34a, 34b and 34c due to the elasticity of the bearing holder 26 as will be described more clearly as the description proceeds. The semicircular peripheral length of each of the groove portions 34a, 34b and 34c is preferably slightly larger than one half of the full circumferential length of a geometrical cylinder having a diameter equal to the diameter of each groove portion or, in other words, each of the semicylindrical groove portions 34a, 34b and 34c has about its center axis a central angle slightly larger than 180 degrees.

The bearing holder 26 is further formed with generally arcuate openings 36a, 36b and 36c in its radial protrusions 28a, 28b and 28c, respectively. The openings 36a, 36b and 36c extend arcuately between adjacent ones of the intermediate wall portions 30a, 30b and 30c of the holder 26 and are contiguous at the radially inner ends of the radial protrusions 28a, 28b and 28c to the semicylindrical groove portions 34a, 34b and 34c, respectively, of the cavity 32. The openings 36a, 36b and 36c being thus directly open to the semicylindrical groove portions 34a, 34b and 34c, respectively, of the cavity 32, each of the semicylindrical groove portions 34a, 34b and 34c is axially divided into substantially congruent two halves adjacent the opposite axial ends, respectively, of the cavity 32. The openings 36a, 36b and 36c are also open at the radially outer ends of the radial protrusions 28a, 28b and 28c, respectively, of the bearing holder 26 but, if desired, may be closed at these ends or, in other words, substituted by recesses which are open only to the semicylindrical groove portions 34a, 34b and 34c, respectively, of the cavity 32, though not shown in the drawings.

For the reason to be explained later, the bearing holder 26 is further formed with a projection 38 projecting radially outwardly of the bearing holder 26 from one of the two lateral ends of one of the radial protrusions 28a, 28b and 28c of the bearing holder 26 such as for example the radial protrusion 28a as shown. The projection 38 longitudinally extends between the opposite axial ends of the radial protrusion 28a substantially in parallel with the center axis of the bearing holder 26. If desired, furthermore, the bearing holder 26 may be formed with an axial gap 40 in one of the intermediate wall portions 30a, 30b and 30c thereof such as for example the intermediate wall portion 30a as shown. The axial gap 40 longitudinally extends between the opposite axial ends of the intermediate wall portion 30a substantially in parallel with the center axis of the bearing holder 26 as indicated by dotted lines in FIG. 3.

The bearing holder 26 thus configured is constructed of an elastic material preferably having a relatively high resistance to oil and a relatively high impact strength. Examples of such a material are acetal resins commercially available under the registered trademarks of "Dulacon" and "Delrin".

Turning back to FIG. 1, the bearing units 12a, 12b and 12c each constructed as described with reference to FIG. 2 are assembled to the bearing holder 26 in such a manner that the individual bearing units 12a, 12b and 12c fit in the semicylindrical groove portions 34a, 34b and 34c, respectively, of the cavity 32. The respective rotatable members 14 of the bearing units 12a, 12b and 12c slightly project into the arcuate openings 36a, 36b and 36c in the radial protrusions 28a, 28b and 28c, respectively, of the bearing holder 26. On the other hand, the respective outer race members 22 and 22' of the ball bearings 18 and 18' of each of the bearing units 12a, 12b and 12c are closely received in the individual halves, respectively, of each of the semicylindrical groove portions 34a, 34b and 34c of the cavity 32. The individual bearing units 12a, 12b and 12c mounted on the bearing holder 26 in this fashion are arranged substantially in symmetry about the center axis of the bearing holder 26 and project substantially semicylindrically into the central portion of the cavity 32 in the bearing holder 26. The rotatable member 14 of each of the bearing units 12a, 12b and 12c is, thus, freely rotatable about the center axis thereof partly through the central portion of the cavity 32 and partly through each of the arcuate openings 36a, 36b and 36c in the radial protrusions 28a, 28b and 28c, respectively, of the bearing holder 26. The openings 36a, 36b and 36c in the radial protrusions 28a, 28b and 28c of the cavity 32 are provided for the purpose of enabling the rotatable members 18 of the bearing units 12a, 12b and 12c to freely rotate with respect to the bearing holder 26 without being interferred by inner wall portions of the bearing holder 26.

The subassembly of the bearing units 12a, 12b and 12c and the bearing holder 32 which are held together in the above described manner is mounted on a casing 42 consisting essentially of a hollow, cylindrical portion 44 and two lug portions 46 and 46' projecting outwardly from the cylindrical portion 44, as shown in FIG. 1. The cylindrical portion 44 of the casing 42 has an inside diameter which is such that the radial protrusions 28a, 28b and 28c of the bearing holder 26 are closely received on or elastically pressed against the inner peripheral surface of the cylindrical portion 44 of the casing 42 when the bearing holder 26 having the bearing units 12a, 12b and 12c incorporated therein as above described is fitted into the cylindrical portion 44 as shown. The cylindrical portion 44 of the casing 42 is formed with an axial gap 48 longitudinally extending between the opposite axial ends of the cylindrical portion 44 substantially in parallel with the center axis of the bore in the cylindrical portion 44. The cylindrical portion 44 of the casing 42 which is constructed of, for example, a casting of metal, is slightly contractable about the center axis of the cylindrical portion 44 having a gap 48 thus formed therein. On the other hand, the lug portions 46 and 46' of the casing 42 are formed on the cylindrical portion 44 of the casing 42 and are spaced apart from each other so as to form therebetween a gap which is contiguous to the axial gap 48 formed in the cylindrical portion 44 of the casing 42. Furthermore, the lug portions 46 and 46' of the casing 42 are formed with bores 50 and 50', respectively, which are substantially aligned with each other across the gap thus formed between the lug portions 46 and 46', as indicated by dotted lines in FIG. 1. A clamping bolt 52 is fitted to the lug portions 46 and 46' through these bores 50 and 50' and is tightened to the lug portions 46 and 46' by means of a nut 54 fastened to the clamping bolt 52. The clamping bolt 52 and the nut 54 constitute, in combination, adjustable clamp means engaging the lug portions 46 and 46' for adjustably clamping the lug portions together and thereby adjustably tightening the cylindrical portion 44 of the casing 42 onto the bearing 26, as will be discussed in more detail.

Before the clamping bolt 52 is thus tightened to the lug portions 46 and 46' of the casing 42 by means of the nut 54, the spindle S to be supported by the bearing assembly 10 is fitted to the subassembly of the bearing holder 26 and the bearing units 12a, 12b and 12c incorporated in the bearing holder. The spindle S or a journal portion of the spindle S is passed through an open space formed between the three bearing units 12a, 12b and 12c in the bearing holder 26 and is in rollable contact with the respective rotatable members 14 (FIG. 2) of the individual bearing units 12a, 12b and 12c. Furthermore, the bearing holder 26 having the bearing units 12a, 12b and 12c assembled thereto is mounted in the cylindrical portion 44 of the casing 42 in such a manner that the projection 38 on the radial protrusion 28a of the bearing holder 26 loosely fits into the axial gap 48 in the cylindrical portion 44 so that the bearing holder 26 is correctly positioned with respect to the cylindrical portion 44 of the casing 42. After the subassembly of the bearing holder 26 and the bearing units 12a, 12b and 12c is thus fitted to the spindle S and the cylindrical portion 44 of the casing 42, the nut 54 is fastened to and turned on the clamping bolt 52 so as to move the lug portions 46 and 46' of the casing 42 toward each other and accordingly cause the cylindrical portion 44 of the casing 42 to elastically contract about the center axis of the cylindrical portion 44. The bolt 52 and nut 54 are tightened to the lug portions 46 and 46' of the casing 42 until the cylindrical portion 44 of the casing 42 thus contracted is sufficiently tightened to the bearing holder 26 against the elastic resistance of the bearing holder 26. As a consequence, the individual bearing units 12a, 12b and 12c are closely and securely captured in the semicylindrical groove portions 34a, 34b and 34c, respectively, of cavity 32 in the bearing holder 26. With the cylindrical portion 44 of the casing 42 thus clamped to the bearing holder 26, the center axis of the spindle S held in position by the three bearing units 12a, 12b and 12c is substantially coincident with the center axis of the bearing holder 26 and the center axis of the cylindrical portion 44 of the casing 42 and, furthermore, the respective rotatable members 18 of the bearing units 12a, 12b and 12c are uniformly and closely held in rollable contact with the spindle S or the journal portion of the spindle S. For the reason which will be understood as the description proceeds, it is preferable that each of the bearing units 12a, 12b and 12c be dimensioned so that the diameter of the rotatable member 18 forming part of each of the bearing units is larger than the diameter of the spindle S or the journal portion of the spindle S.

In the embodiment shown in FIG. 1, the casing 42 is further provided with a grease inlet element 56 secured to a suitable wall portion such as the lug portion 46' of the casing 42. The grease inlet element 56 projects into the cavity 32 in the bearing holder 26 through the lug portion 46' of the casing 42 and one of the openings 36a, 36b and 36c such as for example the opening 36a in the radial protrusion 28a of the bearing holder 26 for providing access of grease or any other lubricating medium to the interior of the bearing holder 26.

Figure 4:
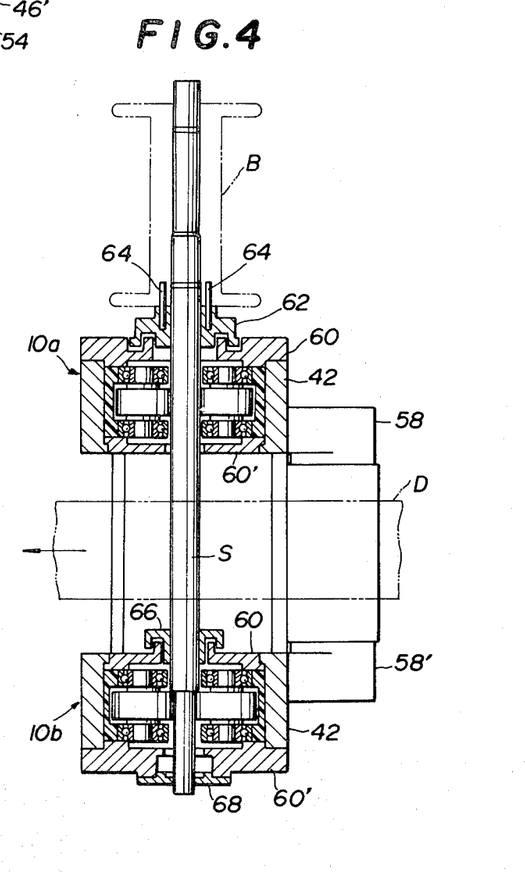
FIG. 4 is a vertical secrional view showing the arrangement in which two bearing assemblies each constructed similarly to the embodiment illustrated in FIG. 1 are used for supporting the spindle of a yarn wrapping machine.

FIG. 4 shows an example of the arrangement in which the spindle S of a yarn wrapping machine is vertically supported by means of two, upper and lower, bearing assemblies 10a and 10b each of which is constructed and arranged similarly to the bearing assembly 10 hereinbefore described with reference to FIGS. 1 to 3.

The yarn wrapping machine is used for wrapping or covering a wadding or core yarn with a spun yarn or filament as is well known in the art of textile production and has a bobbin B detachably mounted on an upper extension of the spindle S as indicated by phantom lines in FIG. 4. The spindle S has two journal portions consisting of an upper journal portion adjacent the above mentioned upper extension of the spindle S and a lower journal portion adjacent the lower end of the spindle S. The upper and lower bearing assemblies 10a and 10b engage these two journal portions, respectively, of the spindle S and are respectively supported by stationary brackets 58 and 58' which are secured to or integral with the respective casings 42 of the bearing assemblies 10a and 10b. In each of the bearing assemblies 10a and 10b, the outer race members 22 and 22' of the respective ball bearings 18 and 18' (FIG. 2) of the three bearing units 12a, 12b and 12c are properly retained in vertical positions in the cylindrical portion 44 of the casing 42 by upper and lower annular members 60 and 60' which are secured to the cylindrical portion 44 of the casing 42 along the upper and lower circumferential ends of the cylindrical portion 44. The spindle S projects upwardly through the central opening in the upper annular member 60 of the upper bearing assembly 10a and has securely mounted thereon a bobbin support disc 62 having a suitable number of pins 64 projecting upwardly from the disc 62. The bobbin B is detachably mounted on the bobbin support disc 62 through the pins 64 which are inserted into the elongated holes (not shown) which are formed in the bobbin B. The bobbin support disc 62 has on its lower side an annular flange or projection slidably received in annular groove formed in the upper annular member 60 attached to the bearing assembly 10a for providing a dustproof seal between the annular member 60 and the spindle S. The spindle S has further securely mounted thereon a flanged hub 66 which is located adjacent the upper annular member 60 of the lower bearing assembly 10b and which projects into the central opening in the annular member 60. The hub 66 is formed with an annular flange or projection slidably received in an annular groove formed in the upper annular member 60 of the bearing assembly 10a for thereby providing a dustproof seal between the annular member 60 and the spindle S. Furthermore, the lower annular member 60' of the lower bearing assembly 10b has attached thereto an annular cover plate 69 which covers the central opening in the annular member 60' at the lower end of the bearing assembly 10b while permitting the spindle S to project slightly downwardly through the cover plate 68 as shown.

When the yarn wrapping machine is in operation, the spindle is driven for rotation about the center axis thereof by suitable drive means which may include, by way of example, an endless belt D which is in part indicated by phantom lines in FIG. 4. The endless belt D is horizontally stretched between two rollers (not shown) and is partially wrapping contact with an intermediate axis portion of the spindle S. Though not shown in the drawings, the two rollers engaging the endless belt D are horizontally spaced apart from each other and are arranged so that one of the rollers is to be driven for rotation by a suitable power-operated drive unit such as an electric motor and the other of the rollers acts as an idler. By the endless belt D thus driven to move in contact with the spindle, the spindle S is driven to rotate about the center axis thereof on the rotatable members 14 of the respective bearing units 12a, 12b and 12c of the two bearing assemblies 10a and 10b and causes each of the rotatable members 14 to rotate about the center axis of each bearing unit in a direction opposite to the direction of rotation of the spindle S. The rotation of the rotatable member 14 of each bearing unit being carried through the shafts 16 and 16' (FIG. 2) to the respective inner race members 20 and 20' of ball bearings 18 and 18' of the bearing unit and is smoothed by the spherical bearing elements 24 and 24' which roll between the respective inner and outer race members 20 and 22 and inner and outer race members 22' and 24' of the bearings 18 and 18'.

The bearing units 12a, 12b and 12c of each of the bearing assemblies 10a and 10b being uniformly forced in radial directions of the bearing holder 26 toward the center axis of the cylindrical portion 44 of the casing 42 and accordingly toward the center axis of the spindle S by means of the elastic bearing holder 26, the pressing forces transferred to the spindle S from the respective rotatable members 14 of the individual bearing units 12a, 12b and 12c are effectively cancelled by one another. The spindle S is, thus, substantially free from any localized load in radial directions of the spindle and is capable of driving the respective rotatable members 14 of the individual bearing units 12a, 12b and 12c by substantially equal forces. The force which may be exerted on the spindle S by the endless belt D forced against the intermediate axial portion of the spindle is taken up by the engagement between the projection 38 of the bearing holder 26 and the cylindrical portion 44 of the casing 42 through the axial gap 42 (FIG. 1) formed in the cylindrical portion 44.

Figure 5:
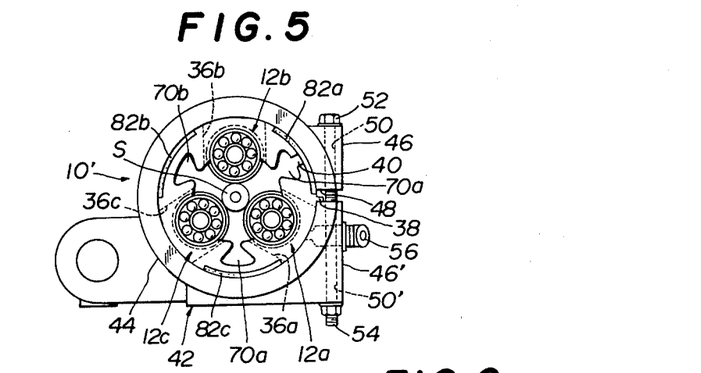
FIG. 5 is a view similar to FIG. 1 but shows another preferred embodiment of a bearing assembly according to the present invention.

FIG. 5 shows a modification of the embodiment hereinbefore described with reference to FIGS. 1 to 4.

In FIG. 5, a bearing assembly, now designated in its entirety by reference numeral 10', is also shown as comprising three bearing units 12a, 12b and 12c. Each of these bearing units 12a, 12b and 12c is constructed similarly to the bearing unit 12 depicted in FIG. 2 and, thus, comprises a rotatable member 14 and two ball bearings 18 and 18' mounted on shafts 14 and 14' projecting from the rotatable member 14 and including inner race members 20 and 20', outer race members 22 and 22', and spherical bearing elements 24 and 24', respectively, which are arranged as previously described in detail with reference to FIG. 2.

Figures 6, 7, 8:
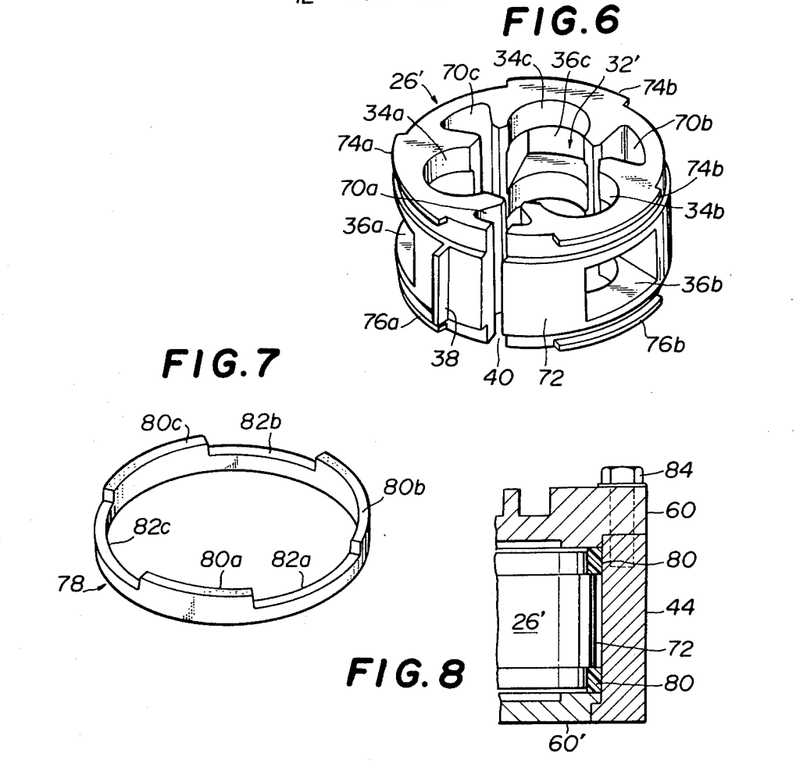
FIG. 6 is a perspective view showing, to an enlarged scale, the bearing holder forming part of the embodiment illustrated in FIG. 5.
FIG. 7 is a perspective view showing, also to an enlarged scale, each of the cushioning elements forming part of the embodiment of FIG. 5.
FIG. 8 is a fragmentary axial sectional view showing part of the bearing assembly illustrated in FIG. 5.

In the bearing assembly 10' illustrated in FIG. 5, the individual bearing units 12a, 12b and 12c are housed in a bearing holder 26' illustrated to an enlarged scale in FIG. 6. Referring to FIG. 6, the bearing holder 26' consists of a unitary block which is constructed of an elastic material such as an acetal resin similarly to the bearing holder 26 shown in FIG. 3 and which has a generally cylindrical external configuration having a center axis therethrough and flat opposite end faces perpendicular to the center axis of the holder. The bearing holder 26' is formed with a cavity 32' which is open at the opposite axial ends of the holder and which includes a central portion about the center axis of the bearing holder and three generally semicylindrical groove portions 34a, 34b and 34c merging radially outwardly from the central portion of the cavity 32'. The groove portions 34a, 34b and 34c in the bearing holder 26' are arranged, shaped and sized similarly to their counterparts in the bearing holder 26 shown in FIG. 3. The bearing holder 26' illustrated in FIG. 6 is further formed with generally arcuate openings 36a, 36b and 36c extending arcuately about the center axis of the bearing holder 26'. Also similarly to their counterparts in the bearing holder 26 shown in FIG. 3, the openings 36a, 36b and 36c in the bearing holder 26' are radially inwardly contiguous and open to the semicylindrical groove portions 34a, 34b and 34c, respectively, of the cavity 32', axially dividing each of the semicylindrical grooves 34a, 34b and 34c into substantially congruent two halves adjacent the opposite axial ends, respectively, of the cavity 32'.

In the bearing holder 26' shown in FIG. 6, each of the semicylindrical groove portions 34a, 34b and 34c of the cavity 32' is formed between two axial ribs projecting radially inwardly from an outer peripheral wall of the bearing holder 26' into the cavity 32' and longitudinally extending in parallel with the center axis of the bearing holder 26'. Between the axial ribs intervening between the adjacent ones of the semicylindrical groove portions 34a, 34b and 34c are formed axial grooves 70a, 70b and 70c which are also open at the opposite axial ends of the bearing holder 26' and which longitudinally extend substantially in parallel with the center axis of the bearing holder 26'. Each of the axial grooves 70a, 70b and 70c intervenes between every adjacent two of the semicylindrical groove portions 34a, 34b and 34c of the cavity 32' and is radially inwardly open to the central portion of the cavity 32' so that the two axial ribs defining each of the axial grooves 70a, 70b and 70c therebetween are separate from each other at their radially inner ends. The semicylindrical groove portions 34a, 34b and 34c of the cavity 32' and the axial grooves 70a, 70b and 70c are thus arranged alternately to one another substantially in symmetry about the center axis of the bearing holder 26'. The bearing holder 26' being constructed of an elastic material, the axial ribs having each of the groove portions 34a, 34b and 34c defined therebetween are elastically deformable away from each other when forced in lateral directions to contract each of the axial grooves 70a, 70b and 70c adjacent the ribs.

The bearing holder 26' shown in FIG. 6 further has a generally cylindrical outer wall formed with a circumferential land 72 projecting radially outwardly from the outer wall and having circumferential edges extending along and axially inwardly of the opposite axial ends of the outer wall as shown. The arcuate openings 36a, 36b and 36c in the bearing holder 26' are open radially outwardly of the outer wall of the bearing holder 26' through this circumferential land 72. It desired, however, the openings 36a, 36b and 36c may be closed in the outer wall of the bearing holder 26' or substituted by recesses which are open only to the semicylindrical groove portions 34a, 34b and 34c, respectively, of the cavity 32' though not shown in the drawings, as in the case of the openings 36a, 36b and 36c provided in the bearing holder 26 shown in FIG. 3. The land 72 of the bearing holder 26' has axially opposite circumferential edges adjacent the opposite axial ends of the bearing holder 26', which is accordingly formed with circumferential grooves which are respectively open at and along the circumferential edges of the bearing holder 26' as shown in FIG. 6. The bearing holder 26' illustrated in FIG. 6 further has a suitable number of generally arcuate projections formed at each axial end of the bearing holder 26'. The arcuate projections at one axial end of the bearing holder 26' are shown consisting of three projections 74a, 74b and 74c which project radially outwardly from one axial end of the above mentioned outer wall of the bearing holder 26' and which extend arcuately along portions of the axial end of the outer wall. Likewise, the arcuate projections provided at the other axial end of the bearing holder 26' are shown to consist of three projections 76a, 76b and 76c (of which the projection 76c is not seen in FIG. 6) projecting radially outwardly from the other axial end of the outer wall of the bearing holder 26' and extending arcuately along portions of the axial end of the outer wall. The arcuate projections 74a, 74b and 74c or 76a, 76b and 76c at each axial end of the bearing holder 26' are substantially equiangularly spaced apart from each other about the center axis of the bearing holder 26' and are shown, by way of example, to be disposed radially outwardly of the semicylindrical groove portions 34a, 34b and 34c, respectively, of the cavity 32'. Thus, the arcuate projections 74a, 74b and 74c at one axial end of the bearing holder 26' are shown as being substantially aligned with the arcuate projections 76a, 76b and 76c, respectively, at the other axial end of the bearing holder 26' in directions parallel with the center axis of the bearing holder 26'. The arcuate projections 74a, 74b and 74c are spaced apart from the adjacent circumferential edge of the land 72 of the bearing holder 26' in the directions parallel with the center axis of the bearing holder 26' so that arcuate groove portions are formed between the circumferential land 72 and the arcuate projections 74a, 74b and 74c, respectively. Likewise, the arcuate projections 76a, 76b and 76c of the bearing holder 26' are spaced apart from the adjacent circumferential edge of the land 72 in the axial directions of the bearing holder 26' and form arcuate groove portions between the land 72 and the arcuate projections 76a, 76b and 76c, respectively. The bearing holder 26' has between every circumferentially adjacent two of the arcuate projections 74a to 74c and 76a to 76c an arcuate recess which intervenes between the arcuate grooves formed between the circumferential land 72 and the two arcuate projections and which is accordingly located, in the arrangement shown, radially outwardly of each of the axial grooves 70a, 70b and 70c in the bearing holder 26'. The arcuate projections 74a to 74c and 76a to 76c have, radially of the bearing holder 26' as a whole, heights substantially equal to the height of the circumferential land 72 with respect to the arcuate groove portions between the land and the arcuate projections or, in other words, have arcuately curved outer faces which are substantially equal in radius of curvature to the outer peripheral surface of the circumferential land 72 of the bearing holder 26'. The arcuate groove portions formed between each circumferential edge of the land 72 and the arcuate projections 74a, 74b and 74c or 76a, 76b and 76c of the bearing holder 26' form part of the circumferential groove extending along each of the outer circumferential edges of the bearing holder 26'.

The bearing holder 26' illustrated in FIG. 6 further has a projection 38 projecting radially outwardly from the circumferential land 72 and extending longitudinally between the opposite axial ends of the land 72 substantially in parallel with the center axis of the bearing holder 26'. The projection 38 is shown to be located adjacent to ends of the arcuate projections 74a and 76a by way of example but may be located anywhere on the circumferential land 72 of the bearing holder 26'. The bearing holder 26' is shown to be further formed with an axial gap 40 in one of its outer wall portions formed with the axial grooves 70a, 70b and 70c such as the outer wall portion formed with the axial groove 70a as shown. The axial gap 40 in the bearing holder 26' longitudinally extends between the opposite axial ends of the bearing holder 26' substantially in parallel with the center axis of the bearing holder 26' and is open to the axial groove 70a radially inwardly of the bearing holder 26'.

To the bearing holder 26' thus configured are disengageably attached two similarly shaped cushioning elements which are commonly represented by a cushioning element 78 in FIG. 7. As illustrated in FIG. 7, the cushioning element 78 is constructed as an annular member having three axial projections 80a, 80b and 80c arcuately extending about the center axis of the element 78. The axial projections 80a, 80b and 80c of the cushioning element 78 are substantially equiangularly spaced apart from each other about the center axis of the cushioning element 78 which is as a consequence formed with arcuate recessed portions 82a, 82b and 82c intervening between the axial projections 80a, 80b and 80c, respectively. One of the two cushioning elements 78 each of which is thus shaped is attached to the bearing holder 26' shown in FIG. 6 in such a manner that the arcuate recessed portions 82a, 82b and 82c of the cushioning element are closely received in the arcuate grooves between the circumferential land 72 and the arcuate projections 74a, 74b and 74c, respectively, of the bearing holder 26' and that the axial projections 80a, 80b and 80c of the cushioning element are closely received in the respective recesses between the arcuate projections 74a, 74b and 74c of the bearing holder 26'. Likewise, the other cushioning element is fitted to the bearing holder 26' in such a manner that the recessed portions 82a, 82b and 82c of the element are closely received in the grooves between the land 72 and the arcuate projections 76a, 76b and 76c, respectively, of the bearing holder 26' and that the axial projections 80a, 80b and 80c of the cushioning element are closely received in the respective recesses between the arcuate projections 76a, 76b and 76c of the bearing holder 26'. Each of the cushioning elements 78 has a thickness or radial measurement slightly larger than the depth of the grooves between the circumferential land 72 and the arcuate projections 74a to 74c or 76a to 76c so that, when the cushioning elements 78 are attached to the bearing holder 26, the cushioning elements 78 protrude slightly from the grooves between the circumferential land 72 and the arcuate projections 74a to 74c and 76a to 76c of the bearing holder 26' in radial directions of the bearing holder unless the cushioning elements 78 is pressed upon radially inwardly of the bearing holder 26'. The cushioning elements 78 are fitted to the bearing holder 26' by elastically expanding each of the cushioning elements 78 so that the arcuate recessed portions 82a, 82b and 82c of the cushioning element take the arcuate projections 74a, 74b and 74c or 76a, 76b and 76c, respectively, of the bearing holder 26'.

Before or after the cushioning elements 78 are thus fitted to the bearing holder 26', the bearing units 12a, 12b and 12c (FIG. 5) are mounted in the semicylindrical portions 34a, 34b and 34c, respectively, of the cavity 32' in the bearing holder 26' in such a manner that has been described in connection with the arrangement illustrated in FIG. 1. In the case of the arrangement shown in FIG. 5 in which the bearing holder 26' is formed with the axial grooves 70a, 70b and 70c in addition to the semicylindrical groove portions 34a, 34b and 34c of the cavity 32', the axial ribs on both sides of each of the groove portions 34a, 34b and 34c are elastically deformed to warp away from each other and thus expand the semicylindrical groove portion therebetween when the bearing unit 12a, 12b or 12c is being forced into the groove portion is being forced thereinto. This will not only provide ease of mounting of the bearing units 12a, 12b and 12c in the bearing holder 26' especially where the material constructing the bearing holder 26' does not have a sufficient elasticity but contribute to establishing sufficiently close fit between the bearing holder 26' and the bearing units 12a, 12b and 12c assembled to the bearing holder 26'.

The subassembly of the bearing holder 26' having the bearing units 12a, 12b and 12c and the cushioning elements 78 thus fitted thereto is mounted on a casing 42 which consists essentially of a hollow cylindrical portion 44 and two lug portions 46 and 46' projecting from the cylindrical portion 44 similarly to its counterpart in the arrangement illustrated in FIG. 1. The bearing holder 26' having the bearing units 12a, 12b and 12c and the cushioning elements 78 fitted thereto is positioned in the cylindrical portion 44 of the casing 42 in such a manner that the projection 38 on the circumferential land 72 of the bearing holder 26' fits into an axial gap 48 formed in the cylindrical portion 44. When the bearing holder 26' is thus positioned in the cylindrical portion 44 of the casing 42, the cushioning elements 78 protruding radially outwardly from the peripheral surfaces of the land 72 and the arcuate projections 74a to 74c and 76a to 76c (FIG. 6) of the bearing holder 26' is in contact with the inner peripheral surface of the cylindrical portion 44 of the casing 42. The spindle S to be supported by means of the bearing assembly 10' is then provisionally fitted to the bearing holder 26' thus positioned in the cylindrical portion 44 of the casing 42. The spindle S or a journal portion of the spindle S is passed through an open space formed between the three bearing units 12a, 12b and 12c in the bearing holder 26' and is in rollable contact with the respective rotatable members 14 (FIG. 2) of the individual bearing units 12a, 12b and 12c.

As previously described with reference to FIG. 1, the lug portions 46 and 46' of the casing 42 are spaced apart from each other to form a gap therebetween and are formed with axially aligned bores 50 and 50', respectively, for passing therethrough a clamping bolt 52 to be engaged by a nut 54. After the bearing holder 26 having the bearing units 12a, 12b and 12c and the cushioning elements 78 fitted thereto is assembled to the casing 42 and the spindle S is passed through the resultant bearing assembly 10', the nut 54 is turned on the clamping bolt 52 so as to move the lug portions 46 and 46' of the casing 42 toward each other and accordingly cause the cylindrical portion 44 of the casing 42 to elastically contract about the center axis of the cylindrical portion 44. As the cylindrical portion 44 of the casing 42 is thus forced to contract radially inwardly with the bearing holder 26' held therein, the cushioning elements 78 surrounding the bearing holder 26' are compressed and cause the bearing holder 26' to also contract about the center axis thereof by reason of its elasticity and further due to the provision of the axial gap 40 in the outer wall of the bearing holder 26'. As a consequence, the individual bearing units 12a, 12b and 12c in the bearing holder 26' are closely and securely seized in the semicylindrical groove portions 34a, 34b and 34c, respectively, of the cavity 32' in the bearing holder 26' and, at the same time, the spindle S retained by the three bearing units 12a, 12b and 12c is correctly brought into a position having its center axis substantially coincident with the center axis of the bearing holder 26' and the center axis of the cylindrical portion 44 of the casing 42. The bearing units 12a, 12b and 12c are therefore uniformly forced in radial dirctions of the bearing holder 26' toward the center axis of the bearing holder 26' and accordingly the center axis of the spindle S so that the pressing forces transferred to the spindle S from the respective rotatable members 14 (FIG. 2) of the individual bearing units 12a, 12b and 12c are effectively cancelled by each other.

In the enbodiment illustrated in FIG. 5, the casing 42 is shown to be further provided with a grease inlet element 56 secured to a suitable wall portion such as the lug portion 46' of the casing 42. As in the case of the embodiment of FIG. 1, the grease inlet element 56 projects into the cavity 32' in the bearing holder 26' through the lug portion 46' of the casing 42 and one of the openings 36a, 36b and 36c such as the opening 36a in the bearing holder 26' as shown.

Figure 9:
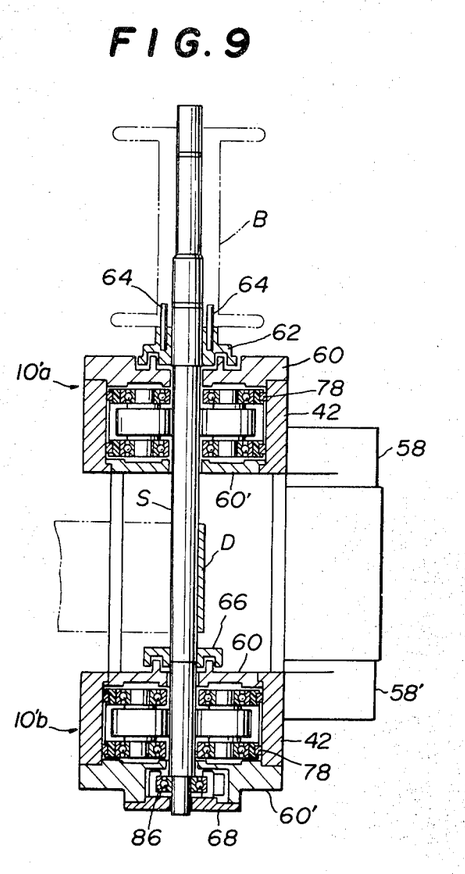
FIG. 9 is a view similar to FIG. 4 but shows the arrangement in which two bearing assemblies each constructed similarly to the bearing assembly illustrated in FIG. 5 are used for supporting the spindle of a yarn wrapping machine.

FIGS. 8 and 9 show an example of the arrangement in which two, upper and lower, bearing assemblies 10'a and 10'b each constructed and arranged similarly to the bearing assembly 10' hereinafter described with reference to FIGS. 5 to 7 are used to vertically support the spindle S of a yarn wrapping machine having a bobbin B detachably mounted on an upper extension of the spindle S. The arrangement illustrated in FIG. 9 is essentially similar to the arrangement shown in FIG. 4 and, thus, the upper and lower bearing assemblies 10'a and 10'b respectively engaging upper and lower journal portions of the spindle S are supported by brackets 58 and 58', respectively, secured to or integral with the respective casings 42 of the bearing assemblies 10'a and 10'b. In each of the bearing assemblies 10'a and 10'b, upper and lower annular members 60 and 60' are securely attached to the cylindrical portion 44 of the casing 42 by suitable fastening means such as bolts as indicated at 84 in FIG. 8 by way of example so that the outer race members 22 and 22' of the respective ball bearings 18 and 18' (FIG. 2) of the bearing units 12a, 12b and 12c are properly retained in vertical positions in the cylindrical portion 44 of the casing 42. In the arrangement illustrated in FIG. 9, the upper and lower annular members 60 and 60' for each of the upper and lower bearing assemblies 10'a and 10'b are further in pressing contact with the axial projections 80a, 80b and 80c of the cushioning elements 78 attached to the bearing holder 26' of the bearing assembly as in part illustrated in FIG. 8 and are, thus, effective to elastically maintain the bearing holder 26' in a proper vertical position in the cylindrical portion 44 of the casing 42 and to dampen out the impacts and vibrations which may be produced vertically between the bearing holder 26' and each of the annular members 60 and 60' secured to the casing 42.

The bobbin B is detachably mounted on a bobbin support disc 64 secured to the upper extension of the spindle S and having pins 74 engaging the bobbin B. The bobbin support disc 64 slidably engages the upper annular member 62 for the bearing assembly 10'a and provides a dustproof seal between the spindle S and the annular member 62. Likewise, a dustproof seal is provided between the spindle S and the upper annular member 62 for the lower bearing assembly 10'b by means of a flanged hub 66 secured to the spindle S and slidably engaging the annular member 60. To the lower annular member 60' for the lower bearing assembly 10'b is attached an annular cover plate 68 which covers the central opening in the annular member 60'. In the arrangement shown in FIG. 9, the lower annular member 60' for the lower bearing assembly 10'b is formed with an annular concavity having a lower end defined by the upper face of the annular cover plate 68 and has mounted in the concavity a suitable bearing 86 adapted to bear a lower end portion of the spindle S in such a manner as to provide an upward thrust for the spindle S. The bearing 86 may thus be constituted by a tapered-roller bearing. If desired, the bearing 86 may be dispensed with as in the arrangement illustrated in FIG. 4.

In accordance with the present invention, the bearing assembly constructed and arranged as hereinbefore described in detail provides the following advantages:

(1) The bearing assembly supports the spindle S by the outer peripheral surfaces of the rotatable members 14 of the three bearing units 12a, 12b and 12c included in the bearing assembly. If, therefore, the respective rotatable members 14 of the individual bearing units 12a, 12b and 12c of the bearing assembly are sized with respect to the spindle S or a journal portion of the spindle S in such a manner that the diameter of each of the rotatable members 13 is a certain number of times larger than the journal portion of the spindle S, each of the inner race members 20 and 20' mounted on the rotatable member 14 by the shafts 16 and 16', respectively, is to be driven for rotation with a number of turns per unit time which is smaller by the particular number of times than the number of turns of the spindle S. If, for example, the spindle S or the journal portion of the spindle S has the diameter of 12 mm and the rotatable member 14 of each of the bearing units 12a, 12b and 12c has the diameter of 36 mm which is thrice larger than the diameter of the former and if the spindle S is driven to make 40,000 turns per minute, each of the inner race members 20 and 20' of each bearing unit will make about 13,333 turns per minute which is approximately equal to one third of the number of turns of the spindle S. Such a revolution speed of the inner race members 20 and 20' with respect to the stationary outer race members 22 and 22' is within the range acceptable for bearings in general and will therefore assure the guaranteed performance quality and service life of the bearing unit.

(2) The bearing units 12a, 12b and 12c engaging the spindle S are positioned substantially in symmetry with respect to the center axis of the spindle S and are uniformly held in pressing and rollable contact with the spindle S or the journal portion of the spindle S by means of the elastic bearing holder 26 or 26'. The pressing forces exterted on the spindle S by the bearing units 12a, 12b and 12c are, thus, cancelled by one another so that the spindle S is substantially free from any localized load in radial directions of the spindle S. The spindle S is therefore enabled to drive the rotatable members 14 of the individual bearing units 12a, 12b and 12c by substantially equal forces and accordingly to rotate smoothly about the center axis thereof without being caused to away or laterally osccilate throughout operation of the bearing assembly.

(3) The spindle S is engaged not by the outer race members 22 and 22' but by the rotatable members 14 of the bearing units 12a, 12b and 12c. If the bearing assembly according to the present invention is modified so that the outer race members 22 and 22' of the bearing units are to engage the spindle S and the rotatable members 14 of the bearing units are to be fixedly fitted to the bearing holder 26 or 26', the circumferential speed of rotation of the outer race members 22 and 22' driven by the spindle S becomes higher than the circumferential speed at which the inner race members 20 and 20' in the bearing units 12a, 12b and 12c of the bearing assembly according to the present invention are to be driven. The arrangement in which the inner race members 20 and 20' are to be driven by the spindle S as in each of the embodiments of the present invention is, for this reason, useful for reducing the wear of a bearing.

(4) If the outer race members 22 and 22' of the bearings units 12a, 12b and 12c are engaged and driven for rotation by the spindle S, furthermore, the bearings 18 and 18' would be subjected to radial loads from the spindle S and as a consequence localized stresses would be caused in each of the bearings units 12a, 12b and 12c by the rotation of the spindle S on the outer race members 22 and 22'. Because, however, of the fact that the spindle S supported by the bearing assembly according to the present invention is engaged by the respective rotatable members 14 of the bearing units 12a, 12b and 12c and that the rotatable member 18 of each bearing unit is supported by the inner race members 20 and 20' of the two ball bearings 18 and 18' provided on both sides of the rotatable member 14, the radial loads imparted to the rotatable members of the bearing units 12a, 12b and 12c from the spindle S are uniformly transferred or distributed to the two bearings 18 and 18' so that each of the bearing units 12a, 12b and 12c is subjected to a negligible amount of localized load.

(5) The individual bearing units 12a, 12b and 12c forming part of the bearing assembly are supported by the casing 42 not directly but by means of the elastic bearing holder 26 and 26'. The forces which are to be imparted in radial directions to the individual bearing units 12a, 12b and 12c from the spindle S and the impacts and vibrations which may be transferred from the spindle S to the bearing units 12a, 12b and 12c during operation of the spindle S are, for this reason, taken up or dampened by the elastic deformation of the bearing holder 26 or 26'.

(6) If the bearing holder 26 in the first embodiment is formed with the axial gap 40 (FIG. 3) or since the bearing holder 26' in the second embodiment is formed with the axial gap 40 in its outer peripheral wall, the bearing holder 26 or 26' is elastically contractable and expansible about the center axis thereof and is capable of more effectively taking up or dampening the forces, impacts or vibrations to be produced between the spindle S and each of the bearing units 12a, 12b and 12c. Provision of the gap 40 in the bearing holder 26 or 26' is, thus, conducive to reduction of shocks and vibrations in the bearing assembly as a whole and will allow selection of the material for the bearing holder from a broad range.

(7) In the embodiment illustrated in FIG. 5, the bearing holder 26' is supported in the cylindrical portion 44 of the casing 42 by means of the resilient cushioning elements 78. The mechanical vibrations which are to be transferred from the spindle S to the bearing units 12a, 12b and 12c during rotation of the spindle S are therefore not only dampened by the elastic bearing holder 26' but absorbed by these cushioning elements 78 so that the wear and abrasion to be caused in the ball bearings 18 and 18' in the bearing units 12a, 12b and 12c can be lessened significantly. In case, furthermore, the members constituting each of the bearing units 12a, 12b and 12c are caused thermally expand by the rotation of the spindle S, the expansion of the members is taken up or compensated for by elastic expansion of the bearing holder 26' which is allowed to expand in the cylindrical portion 44 of the casing 42 due to the resiliency of the cushioning elements 78. The rotatable members 14 of the bearings units 12a, 12b and 12c are, thus, permitted to maintain proper fits on the journal portion of the spindle S and can be prevented from being excessively tightened thereon throughout the operation in which the spindle S is continuously driven for rotation at a superhigh speed for an extended period of time.

(8) The individual bearing units 12a, 12b and 12c of the bearing assembly are detachably fitted to the bearing holder 26 or 26' which is also detachably fitted to the casing 42. Thus, the bearing units 12a, 12b and 12c and also the bearing holder 26 or 26' can be readily disassembled for being serviced or exchanged with new ones simply by releasing the clamping force from the lug portions 46 and 46' of the casing 42.

Although each of the embodiments of the present invention has been herein described and shown as comprising three bearing units 12a, 12b and 12c, it will be apparent that a bearing assembly according to the present invention may comprise more than three bearing units arranged substantially in symmetry about the center axis of the bearing holder configured to be suitable for having the four or more bearing units fitted therein.

While, furthermore, it has been assumed that each of the bearings forming part of each bearing unit is constituted by a ball bearing using spherical bearing elements, the bearings in each of the bearing units of a bearing assembly according to the present invention may be constituted by other types of bearings such as roller or needle bearings if desired.

What is claimed is:

1. A bearing assembly for supporting an elongated rotary member rotatable about the center axis thereof, comprising, in combination, a stationary hollow casing, a bearing holder closely and detachably fitted in the casing and formed with a cavity having a center axis therethrough and including a central portion and at least three generally semicylindrical groove portions merging radially outwardly from the central portion, and bearing units positioned each in part in said semicylindrical groove portions, respectively, and substantially semicylindrically protruding each in part into the central portion of the cavity, each of the bearing units comprising a rotatable member having a circular cross section and rotatable in part through the central portion of the cavity and in part through each of said semicylindrical groove portions about an axis substantially parallel with the center axis of the cavity, and at least one bearing comprising an inner race member positioned on one side of said rotatable member and rotatable with the rotatable member, an outer race member radially spaced apart from the inner race member and closely and detachably fitted to said bearing holder, and a plurality of bearing elements rollably disposed between the inner and outer race members, the respective rotatable members of the individual bearing units being larger in diameter than the respective outer race members in the individual bearing units and forming therebetween an open space for passing said elongated rotary member therethrough so that the elongated rotary member is in rollable contact with the peripheral surfaces of the respective rotatable members of the bearing units and is retained in a position having its center axis substantially in alignment with the center axis of said cavity.

2. A bearing assembly as set forth in claim 1, in which said semicylindrical portions of the cavity in said bearing holder are arranged substantially in symmetry about the center axis of the cavity.

3. A bearing assembly as set forth in claim 1 or 2, in which said bearing holder is further formed with an axial gap extending throughout the axial length of the bearing holder and located intermediate between neiboring two of said semicylindrical groove portions of the cavity in the bearing holder.

4. A bearing assembly as set forth in claim 3, in which said axial gap is substantially parallel with the center axis of the cavity in said bearing holder.

5. A bearing assembly as set forth in claim 1 or 2, in which said bearing holder is further formed with openings respectively open to said semicylindrical groove portions of said cavity radially inwardly of the bearing holder for providing a clearance for the rotation of the rotatable member of each of the bearing units.

6. A bearing assembly as set forth in claim 5, in which said openings are open radially outwardly of the bearing holder.

7. A bearing assembly as set forth in claim 1 or 2, in which said bearing holder is further formed with recesses respectively open to said semicylindrical groove portions of said cavity radially inwardly of the bearing holder for providing a clearance for the rotation of the rotatable member of each of the bearing units.

8. A bearing assembly as set forth in claim 7, in which said recesses are closed radially outwardly of the bearing holder.

9. A bearing holder as set forth in claim 1 or 2, in which said bearing holder is further formed with axial grooves longitudinally extending substantially in parallel with the center axis of the cavity in the bearing holder and open to said central portion of the cavity radially inwardly of the bearing holder, each of the axial grooves intervening between every neighboring two of said semicylindrical groove portions.

10. A bearing holder as set forth in claim 9, in which said bearing holder is further formed with an axial gap extending throughout the axial length of the bearing holder and located intermediate between neighboring two of said semicylindrical groove portions of the cavity in the bearing holder.

11. A bearing holder as set forth in claim 10, in which said axial gap is substantially parallel with the center axis of the cavity in said bearing holder.

12. A bearing assembly as set forth in claim 9, in which said bearing holder is further formed with openings respectively open to said semicylindrical groove portions of said cavity radially inwardly of the bearing holder for providing a clearance for the rotation of the rotatable member of each of said bearing units.

13. A bearing assembly as set forth in claim 12, in which said openings are open radially outwardly of the bearing holder.

14. A bearing assembly as set forth in claim 9, in which said bearing holder is further formed with recesses respectively open to said semicylindrical groove portions of said cavity radially inwardly of the bearing holder for providing a clearance for the rotation of the rotatable member of each of said bearing units.

15. A bearing assembly as set forth in claim 14, in which said recesses are closed radially outwardly of the bearing holder.

16. A bearing assembly as set forth in claim 1, further comprising a generally annular, resilient cushioning element elastically pressed between said casing and said bearing holder.

17. A bearing assembly as set forth in claim 16, in which said bearing holder is further formed with a circumferential groove which is open radially outwardly of the bearing holder, said cushioning element being closely and detachably received in said circumferential groove.

18. A bearing assembly as set forth in claim 17, in which said cushioning element has a plurality of axial projections arcuately extending about the center axis of the cushioning element and in which said bearing holder is further formed with arcuate projections radially outwardly projecting from an axial end of the bearing holder, wherein said circumferential groove in the bearing holder extends adjacent to the outer circumferential edge of the bearing holder at said axial end and said axial projections of said cushioning element are respectively received between said arcuate projections of the bearing holder.

19. A bearing assembly as set forth in claim 16, 17 or 18, in which said cushioning element has a thickness larger than the depth of said circumferential groove in the bearing holder.

20. A bearing assembly as set forth in claim 16, 17 or 18, in which said bearing holder is further formed with an axial gap extending throughout the axial length of the bearing holder and located intermediated between neighboring two of said semicylindrical groove portions of the cavity in the bearing holder.

21. A bearing assembly as set forth in claim 20, in which said axial gap is substantially parallel with the center axis of the cavity in said bearing holder.

22. A bearing assembly as set forth in claim 16, 17 or 18, in which said bearing holder is further formed with openings respectively open to said semicylindrical groove portions of said cavity radially inwardly of the bearing holder for providing a clearance for the rotation of the rotatable member of each of the bearing units.

23. A bearing assembly as set forth in claim 22, in which said openings are open radially outwardly of the bearing holder.

24. A bearing assembly as set forth in claim 16, 17 or 18, in which said bearing holder is further formed with recesses respectively open to said semicylindrical groove portions of said cavity radially inwardly of the bearing holder for providing a clearance for the rotation of the rotatable member of each of the bearing units.

25. A bearing assembly as set forth in claim 24, in which said recesses are closed radially outwardly of the bearing holder.

26. A bearing holder as set forth in claim 16, 17 or 18, in which said bearing holder is further formed with axial grooves longitudinally extending substantially in parallel with the center axis of the cavity in the bearing holder and open to said central portions of the cavity radially inwardly of the bearing holder, each of the axial grooves intervening between every neighboring two of said semicylindrical groove portions.

27. A bearing holder as set forth in claim 26, in which said bearing holder is further formed with an axial gap extending throughout the axial length of the bearing holder and located intermediate between neighboring two of said semicylindrical groove portions of the cavity in the bearing holder.

28. A bearing holder as set forth in claim 27, in which said axial gap is substantially parallel with the center axis of the cavity in said bearing holder.

29. A bearing assembly as set forth in claim 26, in which said bearing holder is further formed with openings respectively open to said semicylindrical groove portions of said cavity radially inwardly of the bearing holder for providing a clearance for the rotation of the rotatable member of each of said bearing units.

30. A bearing assembly as set forth in claim 29, in which said openings are open radially outwardly of the bearing holder.

31. A bearing assembly as set forth in claim 26, in which said bearing holder is further formed with recesses respectively open to said semicylindrical groove portions of said cavity radially inwardly of the bearing holder for providing a clearance for the rotation of the rotatable member of each of said bearing units.

32. A bearing assembly as set forth in any one of claims 1, 2, 16, 17 and 18, in which said casing comprises a hollow, generally cylindrical portion having said bearing holder closely and detachably fitted on the inner peripheral surface of the cylindrical portion, the cylindrical portion of the casing being formed with an axial gap extending throughout the axial length of the cylindrical portion so that the cylindrical portion is elastically contractable and expansible about the center axis of the cylindrical portion.

33. A bearing assembly as set forth in claim 32, in which said casing further comprises two lug portions fast on said cylindrical portion and spaced apart from each other for forming therebetween a gap contiguous to said axial gap in the cylindrical portion, said casing being provided with adjustable clamp means engaging said lug portions for adjustably clamping the lug portions together and thereby adjustably tightening said cylindrical portion of the casing onto the bearing holder fitted in the cylindrical portion.

34. A bearing assembly as set forth in claim 33, in which said bearing holder is further formed with a projection radially outwardly projecting from the bearing holder and engaging said cylindrical portion of the casing through said axial gap in the cylindrical portion.

35. A bearing assembly as set forth in claim 32, in which said bearing holder is further formed with an axial gap extending throughout the axial length of the bearing holder and located intermediate between neiboring two of said semicylindrical groove portions of the cavity in the bearing holder.

36. A bearing assembly as set forth in claim 35, in which said axial gap is substantially parallel with the center axis of the cavity said bearing holder.

37. A bearing assembly as set forth in claims 32, in which said bearing holder is further formed with openings respectively open to said semicylindrical groove portions of said cavity radially inwardly of the bearing holder for providing a clearance for the rotation of the rotatable member of each of the bearing units.

38. A bearing assembly as set forth in claim 37, in which said openings are open radially outwardly of the bearing holder.

39. A bearing assembly as set forth in claim 32, in which said bearing holder is further formed with recesses respectively open to said semicylindrical groove portions of said cavity radially inwardly of the bearing holder for providing a clearance for the rotation of the rotatable member of each of the bearing units.

40. A bearing assembly as set forth in claim 39, in which said recesses are closed radially outwardly of the bearing holder.

41. A bearing holder as set forth in claim 32, in which said bearing holder is further formed with axial grooves longitudinally extending substantially in parallel with the center axis of the cavity in the bearing holder and open to said central portions of the cavity radially inwardly of the bearing holder, each of the axial grooves intervening between every neighboring two of said semicylindrical groove portions.

42. A bearing holder as set forth in claim 41, in which said bearing holder is further formed with an axial gap extending throughout the axial length of the bearing holder and located intermediate between neighboring two of said semicylindrical groove portions of the cavity in the bearing holder.

43. A bearing holder as set forth in claim 42, in which said axial gap is substantially with the center axis of the cavity in said bearing holder.

44. A bearing assembly as set forth in claim 41, in which said bearing holder is further formed with openings respectively open to said semicylindrical groove portions of said cavity radially inwardly of the bearing holder for profiding a clearance for the rotation of the rotatable member of each of said bearing units.

45. A bearing assembly a set forth in claim 44, in which said openings are open radially outwardly of the bearing holder.

46. A bearing assembly as set forth in claim 41, in which said bearing holder is further formed with recesses respectively open to said semicylindrical groove portions of said cavity radially inwardly of the bearing holder for providing a clearance for the rotation of the rotatable member of each of said bearing units.

47. A bearing assembly as set forth in claim 46, in which said recesses are closed radially outwardly of the bearing holder.

48. A bearing assembly as set forth in claim 32, in which said cushioning element has a thickness larger than the depth of said circumferential groove in the bearing holder.

49. A bearing assembly as set forth in claim 32, in which said semicylindrical groove portions of the cavity in said bearing holder are arranged substantially in symmetry about the center axis of the cavity.

* * * * *